United States Patent
Burnard et al.

(10) Patent No.: US 6,684,119 B2
(45) Date of Patent: Jan. 27, 2004

(54) METHOD OF PROVIDING DYNAMIC PRODUCTION MATERIAL REPLENISHMENT INFORMATION VIA AN INTERNET

(75) Inventors: Mike Robert Burnard, Canton, MI (US); Lawton Chen, Maldon (GB); Richard Thomas DeMuro, Ann Arbor, MI (US)

(73) Assignee: Ford Motor Company, Dearborn, MI (US)

( * ) Notice: Subject to any disclaimer, the term of this patent is extended or adjusted under 35 U.S.C. 154(b) by 309 days.

(21) Appl. No.: 09/775,787

(22) Filed: Feb. 3, 2001

(65) Prior Publication Data

US 2002/0107601 A1 Aug. 8, 2002

Related U.S. Application Data

(60) Provisional application No. 60/219,479, filed on Jul. 19, 2000.

(51) Int. Cl.[7] .............................................. G06F 19/00
(52) U.S. Cl. ...................... 700/106; 700/99; 700/108; 705/28
(58) Field of Search ........................... 235/385; 700/99, 700/108, 216, 233, 236, 106; 705/28–29

(56) References Cited

U.S. PATENT DOCUMENTS

| | | | | |
|---|---|---|---|---|
| 5,712,989 A | * | 1/1998 | Johnson et al. ............. 705/28 |
| 5,847,957 A | * | 12/1998 | Cohen et al. ............... 700/108 |
| 5,869,819 A | | 2/1999 | Knowles et al. | |
| 6,081,789 A | * | 6/2000 | Purcell ........................ 705/37 |
| 6,249,774 B1 | * | 6/2001 | Roden et al. ................. 705/28 |
| 6,317,082 B1 | * | 11/2001 | Bacon et al. ................ 342/465 |
| 6,341,271 B1 | * | 1/2002 | Salvo et al. .................. 705/28 |
| 6,366,829 B1 | * | 4/2002 | Wallace ..................... 700/236 |
| 2001/0051905 A1 | * | 12/2001 | Lucas .......................... 705/29 |
| 2002/0010659 A1 | * | 1/2002 | Cruse et al. .................. 705/28 |

* cited by examiner

Primary Examiner—Leo Picard
Assistant Examiner—Alexander Kosowski
(74) Attorney, Agent, or Firm—David B. Kelley

(57) ABSTRACT

A method of providing dynamic production material replenishment information via an internet includes the steps of tracking real-time usage of material used for a product, maintaining the tracked real-time material usage within a computer database on a local computer network and replicating the tracked real-time material usage on a global business network in communication with the local communication network. The method also includes the steps of providing a user internet access to a material usage information web site, identifying if a user has permission to access the material usage information web site and selecting a predetermined attribute of the tracked real-time material usage by the user. The method further includes the steps of providing the tracked real-time material usage on the material usage information web site based on the selected attributes and using the tracked real-time material usage by the user in replenishing the material.

19 Claims, 3 Drawing Sheets

METHOD OF PROVIDING DYNAMIC PRODUCTION MATERIAL REPLENISHMENT INFORMATION VIA AN INTERNET

CROSS-REFERENCE TO RELATED APPLICATION(S)

The present application claims the priority date of co-pending U.S. Provisional Patent Application Ser. No. 60/219,479, filed Jul. 19, 2000.

BACKGROUND OF THE INVENTION

1. Field of the Invention

The present invention relates generally to a method and, more specifically, to a method of providing dynamic production material replenishment information via an internet.

2. Description of the Related Art

Manufacturing and assembly operations for a product, and in particular a vehicle, involve various lean manufacturing strategies to increase competitiveness and reduce related costs. One strategy includes synchronized delivery of parts to a manufacturing or assembly plant, where the plant maintains a minimal level of inventory. This requires close inventory control and frequent shipments from a supplier of material to the plant. An advantage of this lean manufacturing strategy is that the inventory of material within the plant is minimized and that material is supplied to the plant based on actual and predicted needs. Frequently, the material is received and moved directly to the line to reduce storage, handling and damage expenses.

In order for this type of material replenishment system to work, close communication between the material supplier and the manufacturing or assembly plant is necessary. In the past, the material replenishment system within the plant would assess the actual usage of material, such as a component part, on a periodic basis, such as once a day or once a week. The plant would then periodically provide the supplier of the component part with the actual or predicted usage information, allowing the supplier to adjust their production and shipping schedules accordingly.

However, this system does not provide for a quick reaction by the supplier to variations in the manufacturing schedule, since predicted usage is affected by various conditions, both foreseen and unforeseen, within the plant. To compensate, a supplier will frequently ship extra material to the plant in order to protect the plant from a material shortage if a variance occurs. As a result, the plant has to stock and manage the extra component parts until they are required on the line. This reduces the effectiveness of the goals of lean manufacturing.

Lean manufacturing relies on the communication of information between the manufacturing or assembly plant and the supplier. Advantageously, an internet, provides a mechanism for enhanced communication of information between the plant and the supplier. An internet, and in particular the Internet, is a global system of interconnected networks that utilize a standardized Internet Protocol (IP) as the network layer protocol. The Internet, also referred to as the World Wide Web (the Web), has become an accepted gateway providing a user with interactive access to information, and/or goods or services, through the use of hypermedia. As is known in the art, a user can access a particular location on the Web, referred to as a web site, using an address written in HyperText Transfer Protocol (HTTP). The content and format of a web site on the web is written in a computer language such as HyperText Markup Language (HTML), a computer language used to specify the content and format of a hypermedia document.

One effect of the explosive growth and acceptance of the Web is the advance of electronic commerce, referred to as e-commerce. Another effect is the expanding use of the Internet for transactions between businesses, referred to as B2B. An e-commerce web site hosted by a business facilitates the B2B transaction. Thus, there is a need in the art for a method of providing dynamic material replenishment information via a web site on an internet that provides real time material usage to enhance synchronous material flow through a supply chain for an assembly process.

SUMMARY OF THE INVENTION

Accordingly, the present invention is a method of providing dynamic production material replenishment information via an internet. The method includes the steps of tracking real-time usage of material used for a product, maintaining the tracked real-time material usage within a computer database on a local computer network and replicating the tracked real-time material usage on a global business network in communication with the local communication network via the internet. The method also includes the steps of providing a user internet access to a material usage information web site hosted by the global business network, identifying if a user has permission to access the material usage information web site and selecting a predetermined attribute of the tracked real-time material usage by the user if the user has permission. The method further includes the steps of providing the tracked real-time material usage on the material usage information web site based on the selected attributes and using the tracked real-time material usage by the user in replenishing the material.

One advantage of the present invention is that a method of providing dynamic material replenishment information on an internet is provided that allows a supplier access to real-time material usage information. Another advantage of the present invention is that the method of providing dynamic material replenishment information can be integrated with an existing material replenishment system. Still another advantage of the present invention is that the method of providing dynamic material replenishment information offers a supplier access to part usage data from multiple manufacturing or assembly plant locations. Yet another advantage of the present invention is that the method of providing dynamic material replenishment information includes web site security, so only the actual supplier of the material can access the part usage information for the material. A further advantage of the present invention is that it supports a lean manufacturing goal of having the right material at the manufacturing or assembly plant at the right time based on actual build information and not predicted build estimates. Still a further advantage of the present invention is that the supplier can manage their own in-plant material inventory and implement their own lean manufacturing strategies.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
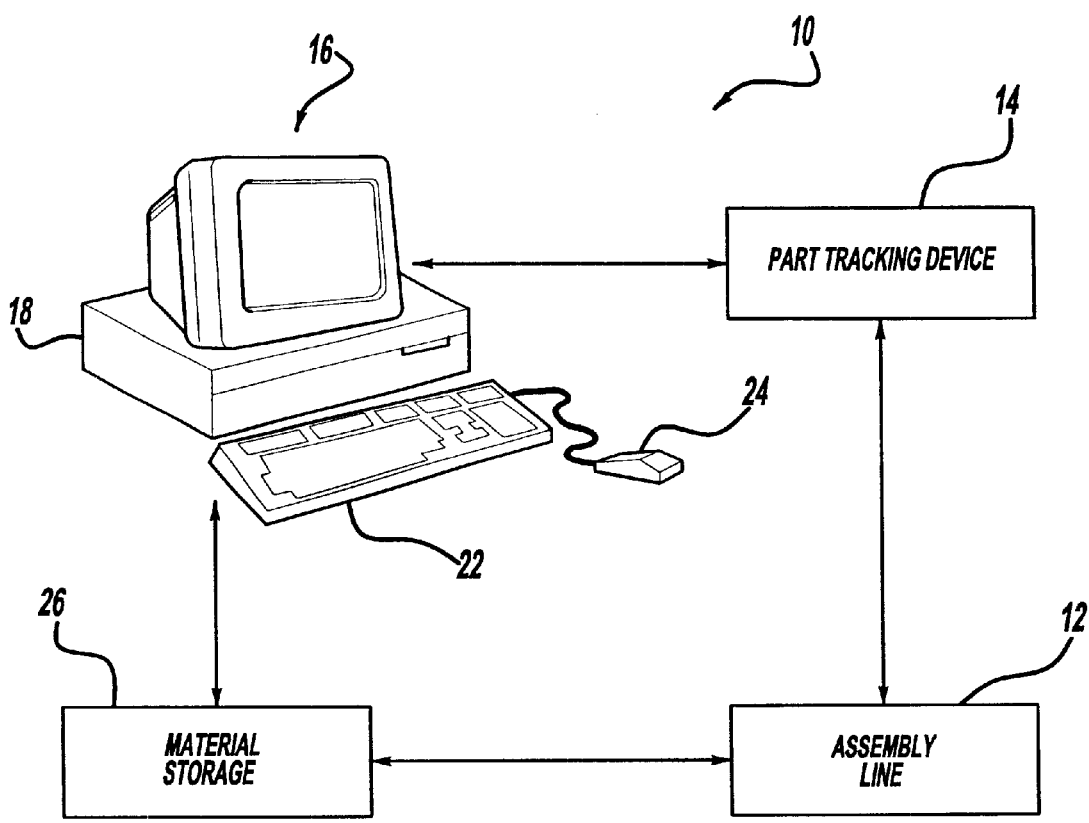
FIG. 1 is a block diagram of a material replenishment system utilized in conjunction with a method of providing dynamic material replenishment information via an internet according to the present invention.

Referring to FIG. 1, a diagrammatic example of a material replenishment system 10 is illustrated for use in conjunction with a method, according to the present invention, of providing dynamic material replenishment information via a web site on an internet. The material replenishment system 10 includes an assembly line 12 for assembling a product within an assembly plant (not shown) in this example. Preferably, material is pulled to the assembly line 12 in a lean manufacturing environment. It should be appreciated that the material may be stored in a container. An operator (not shown) selects material, such as a component part, from the container for installation on the product.

The use of the component part on the assembly line 12 is acknowledged by a material tracking device 14. It should be appreciated that depending on the type of material, the use of a single component part or a container of many component parts may be acknowledged. An example of a material tracking device 14 is a card reader, as is known in the art, that reads a material inventory card included in a container of material and removed at a certain point, such as when the container is empty or almost empty. Another example of a material tracking device 14 known in the art is a bar code reader that reads an affixed bar code label, such as on the container or the component part. Another example of a material tracking device 14 known in the art is a material call button located at the assembly line 12 that is actuated by the operator at a predetermined time, such as when the container is empty.

The material replenishment system 10 includes a material tracking computer system 16 operatively in communication with the material tracking device 14. The material tracking computer system 16 includes a computer 18 with a processor and memory, a display screen 20, a modem (not shown) and an input device such as a keyboard 22 or a mouse 24. It should be appreciated that the material tracking computer system 16 may include a plurality of local computers in communication with a host computer, referred to as a server, as is known in the art. The material tracking system 10 maintains a database containing relevant usage information for each component part used in assembling the product. For example, the database contains information such as part number, supplier identification code, and time and date of usage.

The material tracking system 10 includes a material storage system, shown at 26, operatively in communication with the material tracking computer system 16. The material storage system 26 receives a signal from the material tracking computer system 16 indicating that a container of material stored in a material storage area, is required by the assembly line 12. A material handler (not shown) delivers the container of material from the storage area to the assembly line 12 for assembly on the product.

Figure 2:
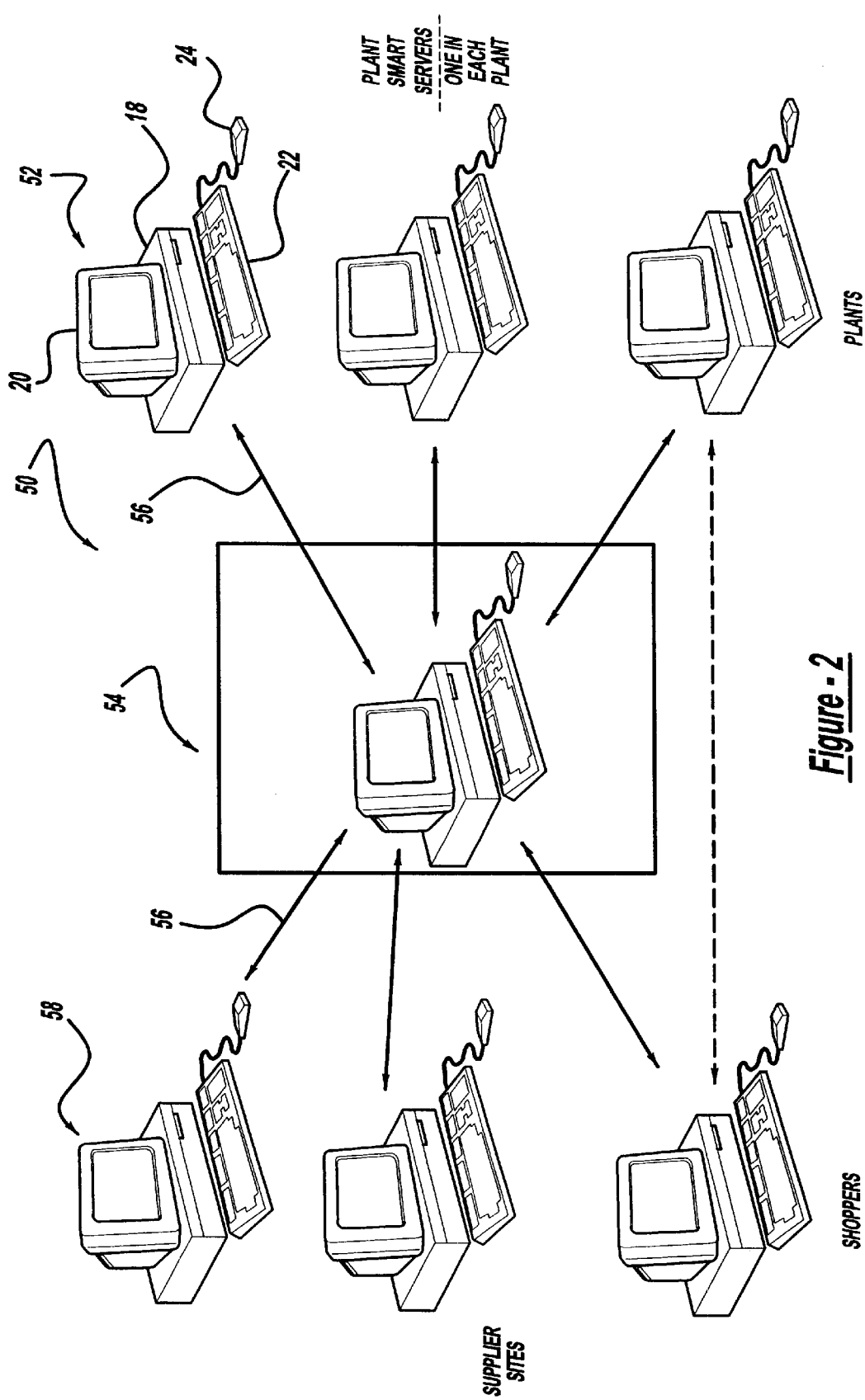
FIG. 2 is a block diagram of a system utilized with a method of providing dynamic material replenishment information via an internet, according to the present invention.

Referring to FIG. 2, a communication network utilized in conjunction with a method of providing dynamic material replenishment information via a web site on an internet, according to the present invention, is illustrated. The network 50 includes a local computer network 52 that maintains real time usage information for each component part assembled on the product. Preferably, the local computer network 52 is the material tracking computer system 16 for the material replenishment system 10 located in the assembly plant, as previously described. It should be appreciated that there is a local computer network 52 for each assembly plant that manufacturers the product.

The network 50 also includes a global business network 54. The global business network 54 is a centralized server in communication with the local computer network 52 for the assembly plant. The global business network 54 includes a computer 18 having a memory and a processor, a display screen 20, and an input device such as a keyboard 22 or a mouse 24, and a modem as previously described with respect to the material tracking computer system 16.

The global business network 54 is connected to the local computer network 52 using an internet infrastructure, such as the Internet (not shown) via a telecommunication link shown at 56, such as a telephone line or a cable line. As is known in the art, the Internet includes providers (not shown) such as Internet Access Providers (IAPs), Internet Service Providers (ISPs), and Network Service Providers (NSPs), and routers (not shown) that provide wired and wireless digital telecommunications throughout the world using a TCP/IP networking protocol.

It should be appreciated that the global business network 54 may be operatively connected by the Internet directly, or it may be operatively connected to a Local Area Network (LAN) (not shown), over which information is transmitted to other computers (not shown) on the same LAN or to computers (not shown) on other LANS (not shown) through a localized Intranet such as a Corporate Intranet. The information can be transmitted between the user and the Internet via the Intranet. The Internet also includes a plurality of web site servers that interactively transfer information to the user through the user's computer. The web site server is a computer system operatively connected to a provider in a conventional manner.

Preferably, the global business network 54 is a host of a web site. The web site provides for interactive communication between the host of the web site and a visitor to the web site, referred to as a user. The communication is facilitated by a series of screens, referred to as pages displayed on the display screen 20, with the first page referred to as a home page. The user may interact with the page via the input device 22,24, such as by making selections or requests. It should be appreciated that, in this example, the global business network 54 is part of a corporate Intranet.

The network 50 also includes a supplier computer network 58 in communication with the global business network 54. The supplier computer network 58 is a computer system 18 as previously described including a processor and memory, a display screen 20, a modem, and an input device such as a keyboard 22 or a mouse 24. The supplier computer network 58 accesses the global business network 54 through the Intranet, in this example.

It should be appreciated that the global business network 54 may include a user identification system, whereby the supplier computer network 58 accessing the Intranet is assigned a unique user ID and an IP (Internet Protocol) address. It should also be appreciated that the Intranet connection is conventional and known in the art.

In another embodiment, the supplier computer network directly communicates with the local computer network in the assembly plant via the Internet, as shown by a dotted line at 60 in FIG. 2. In this example, the local computer network 52 functions in a manner similar to the global computer network 54, as previously described, to provide real time material usage information.

Figure 3:
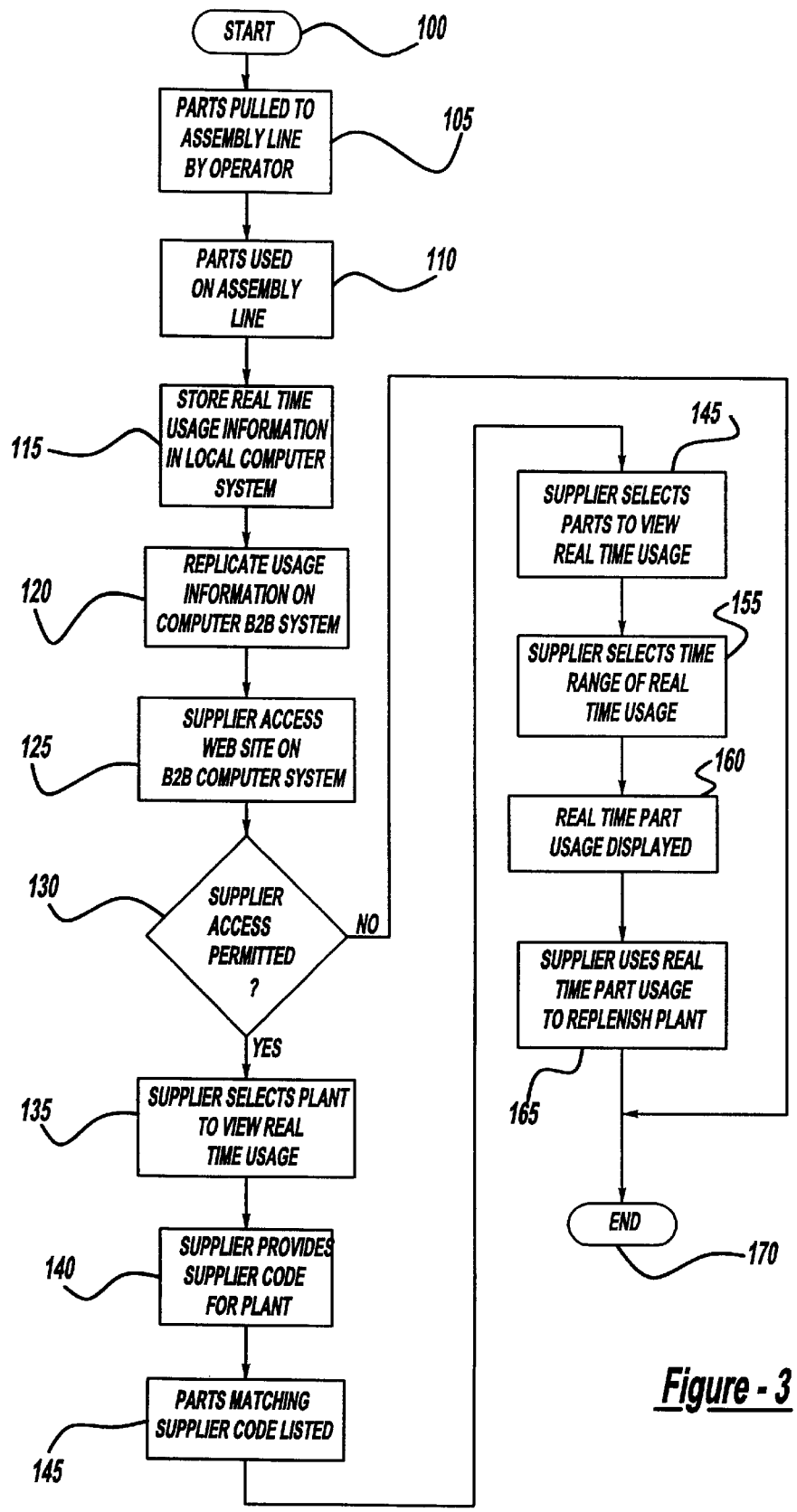
FIG. 3 is a flowchart illustrating a method of providing dynamic material replenishment information via an internet, according to the present invention.

Referring to FIG. 3, a method, according to the present invention, of providing dynamic material replenishment information via a web site on the Internet is illustrated in conjunction with the material replenishment system 10 of FIG. 1 and the communication network 50 of FIG. 2. Preferably, the manufacturer and supplier are engaged in a B2B relationship within an e-commerce environment. The method begins in block 100 and continues to block 105.

In block 105, the material is pulled to the assembly line 12 as part of a material replenishment system 10, as previously described. The methodology advances to block 110, and an operator installs the component part on the product. It should be appreciated that usage of the component part is tracked by the material replenishment system 10, as previously described with respect to FIG. 1. The methodology advances to block 115. In block 115, the real time usage information for the particular component part as it is installed on the product is tracked and maintained on the local computer network 52 within the assembly plant. The methodology advances to block 120.

In block 120, the real time usage information for the material is replicated on the computer for the global business network 54. It should the appreciated that the real time usage information is dynamically updated, as the material is installed on the product at the assembly line 12. The methodology advances to block 125.

In block 125, the supplier accesses a material usage information web site on the global business network 54 maintained by the manufacturer. Preferably, the supplier has unrestricted access to this web site, to obtain real time usage information for material they supply a particular assembly plant. The methodology advances to diamond 130.

In diamond 130, the material usage information web site determines if the supplier has permission to access the web site. For example, the supplier visiting the web site hosted by the manufacturer may logon using a user identification code. Preferably, the web site is an E-commerce web site for a product, such as a motor vehicle, that is administered by the manufacturer for the benefit of its suppliers.

By logging-on to the web site, the supplier is identified by the global business network 54 and the global business network 54 checks if the supplier has permission to access the web site. In one example, the supplier may be provided a supplier identification code for accessing the global business network 54. In another example, a returning user to the web site is identified through an identification code for the user embedded in a cookie stored on the user's computer. If the supplier is not permitted to access the web site, the methodology advances to bubble 170 and ends.

Returning to diamond 130, if the supplier is permitted access to the website, the methodology advances to block 135. In block 135, the web site presents the user 12 with a page displayed on the display screen 20 containing predetermined information options. Preferably, the first page presented by the web server is a home page consisting of a main page presenting an attractive overview of the available information at the web site, with more specific information embedded in subsequent pages. For example, the supplier can select a "Manufacturing" page from a drop down menu. The methodology advances to block 135.

In block 135, the web site instructs the supplier to select an assembly plant to obtain real time usage information from the selected assembly plant. Preferably, the assembly plant is selected from a drop down menu displayed on the display screen 20. The methodology advances to block 140. In block 140, the web site instructs the supplier to provide a supplier material identification code for the material they provide the selected assembly plant. Preferably, each supplier is assigned a supplier material identification code for the material they supply a particular assembly plant. The methodology advances to block 145.

In block 145, a list of material provided by the supplier to the selected assembly plant is displayed on the display screen 20. It should be appreciated that the supplier material identification code is matched to identification information for the material that is maintained as part of the material replenishment system 10. The methodology advances to block 150, and the supplier select a component part to obtain its real time usage information from a list displayed on the display device 20. It should be appreciated that the supplier can select one or more or all of the parts they supply the assembly plant to view the usage information. The methodology advances to block 155 and the supplier selects a time range for which the supplier wishes to view the usage from a range of times displayed on the display device 20. For example, the supplier can select the last two hours of usage, yesterday's usage or the like. Advantageously, the supplier can access the information for the time-frame relevant to their own business needs.

The methodology advances to block 160, and the real time part usage information for the selected component part within the selected time frame is displayed on the display screen 20. Advantageously, the supplier may be provided a choice of formats in which to receive the results, such as an HTML or a spreadsheet format.

The methodology advances to block 165 and the supplier uses the real time part usage information in their business operations. For example, the supplier can devise a production schedule based on this information. The supplier can also base a shipping schedule on this information. Advantageously, the supplier can adjust material replenishment into the plant to avoid material outage or overage conditions. This information can also be used by a material carrier who transports material between the supplier and the assembly plant.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of providing dynamic production material replenishment information via an internet, said method comprising the steps of:

tracking real-time usage of material used for a product at a plurality of manufacturing plants;

maintaining the tracked real-time material usage information within a computer database on a local computer network at each of the manufacturing plants;

replicating the tracked real-time material usage information from each of the manufacturing plants on a global business network in communication with the local communication network via the internet;

providing a user internet access to a material usage information web site hosted by the global business network;

identifying if a user has permission to access the material usage information web site;

selecting one of the manufacturing plants by the user to obtain real time usage information from the selected manufacturing plant if the user has permission;

displaying a list of materials provided by the user to the selected manufacturing plant;

selecting a material from the list of materials for obtaining the tracked real-time material usage information by the user;

displaying a range of times;

selecting a time frame from the range of times for obtaining the tracked real-time material usage information by the user;

providing the tracked real-time material usage information for the selected material within the selected time frame on the material usage information web site; and using the tracked real-time material usage information by the user in replenishing the material to the selected manufacturing plant.

2. A method as set forth in claim 1 including the step of pulling material to an assembly line as part of a material replenishment system for replenishing material used on the assembly line for a product.

3. A method as set forth in claim 1 including the step of incorporating the material in the product.

4. A method as set forth in claim 1 wherein said step of tracking real-time material usage includes maintaining the tracked real-time material usage information on a local computer network within an assembly plant for the assembly line.

5. A method as set forth in claim 1 wherein said step of replicating the tracked material usage includes replicating the material usage in real-time.

6. A method as set forth in claim 1 wherein said step of providing a user internet access includes providing the user access to an Intranet.

7. A method as set forth in claim 1 wherein said step of identifying a user includes the step of checking a user identification code for the user to determine if the user has permission to access the material usage information web site.

8. A method of providing dynamic production material replenishment information via an internet, said method comprising the steps of:

tracking real-time usage information for a component part installed on a product in a plurality of assembly plants;

maintaining the tracked real-time material usage information within a computer database on a local computer network within each of the assembly plants, wherein the real-time material usage information is dynamically updated;

replicating the real-time material usage information from each of the assembly plants on a global business network in communication with the local communication network via the internet, wherein the real-time material usage is dynamically updated in real-time;

providing a user internet access to a material usage information web site hosted by the global business network;

identifying if a user has permission to access the material usage information web site;

selecting one of the assembly plants by the user to obtain real time usage information from the selected assembly plant if the user has permission;

displaying a list of materials provided by the user to the selected assembly plant;

selecting the component part from the list of materials for obtaining tracked real-time material usage information by the user;

displaying a range of times;

selecting a time frame from the range of times for obtaining tracked real-time material usage information by the user;

providing the tracked real-time material usage information for the selected component part within the selected time frame on the material usage information web site; and using the tracked real-time material usage information by the user in replenishing the component part to the selected assembly plant.

9. A method as set forth in claim 8 including the step of moving the component part to the assembly line as part of a material replenishment system for replenishing the component part used on the assembly line for the product.

10. A method as set forth in claim 8 including the step of incorporating the component part on the product.

11. A method as set forth in claim 8 wherein said step of providing a user internet access includes providing the user access to an Intranet.

12. A method as set forth in claim 8 wherein said step of identifying a user includes the step of checking a user identification code for the user to determine if the user has permission to access the material usage information web site.

13. A system of providing dynamic production material replenishment information comprising:

a plurality of manufacturing plants;

a local computer network at each of the manufacturing plants having a computer database maintaining tracked real-time usage of material used for a product at the corresponding manufacturing plant;

a global business network in communication with said local communication network via the internet replicating the tracked real-time material usage;

a supplier computer network in communication with said global business network to allow a user internet access to a material usage information web site hosted by said global business network;

said global business network including a user identification system to identify if a user has permission to access the material usage information web site; and said global business network allowing the user to select one of the manufacturing plants to obtain real time usage information from the selected manufacturing plant if the user has permission and displaying a list of materials provided by the user if the user has permission and allowing selection of a material from the list of materials for obtaining tracked real-time material usage information by the user, displaying a range of times, allowing selection of a time frame from the range of times for obtaining tracked real-time material usage by the user, providing the tracked real-time material usage for the selected material within the selected time frame on the material usage information web site and allowing the user to use the tracked real-time material usage in replenishing the material to the selected manufacturing plant.

14. A system as set forth in claim 13 wherein said global business network includes a display for displaying the web site.

15. A system as set forth in claim 13 including an internet infrastructure to allow communication between said local computer network and said global business network.

16. A system as set forth in claim 15 including a telecommunications link between said internet infrastructure and said global business network and said local computer network.

17. A system as set forth in claim 13 including a material tracking device to acknowledge use of a component part on an assembly line for the product.

18. A system as set forth in claim 17 wherein said material tracking device comprises one of a card reader, bar code reader, and material call button located at the assembly line for the product.

19. A system as set forth in claim 17 wherein said local computer network comprises a material computer tracking system network in communication with said material tracking device.

* * * * *